WAITE & WATTS.
Water Filter.
No. 62,714.
Patented March 5, 1867.
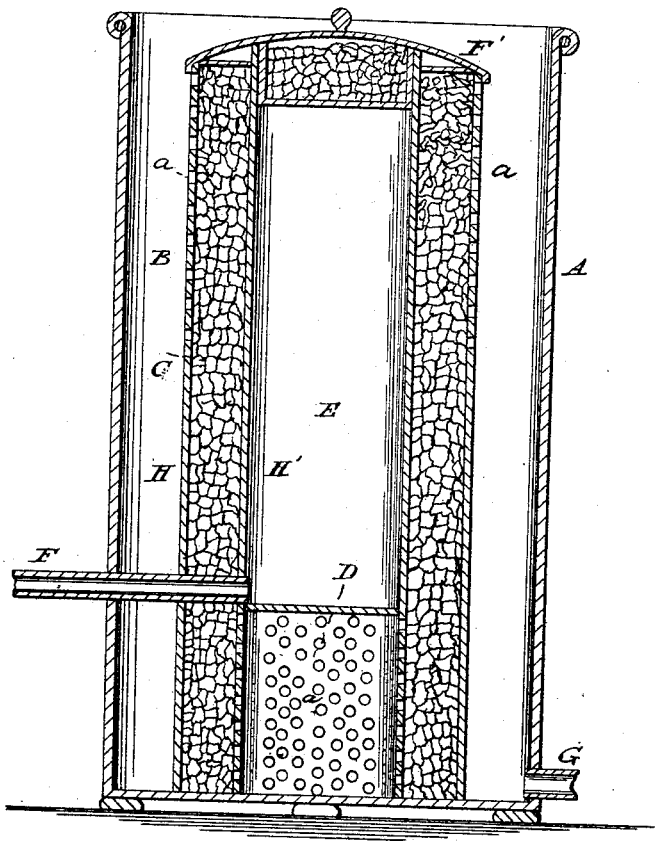

United States Patent Office.

GEORGE WAITE, OF NEW ORLEANS, LOUISIANA, ADMINISTRATOR OF THE ESTATE OF JOHN WATTS, DECEASED.

*Letters Patent No. 62,714, dated March 5, 1867.*

IMPROVEMENT IN FILTERS.

*The Schedule referred to in these Letters Patent and making part of the same.*

TO ALL WHOM IT MAY CONCERN:

Be it known that I, GEORGE WAITE, of New Orleans, in the parish of Orleans, and State of Louisiana, and JOHN WATTS, deceased, late of same place, have invented a new and useful Improvement in Water Filters; and I, the said GEORGE WAITE, administrator of said WATTS, do hereby declare that the following is a full, clear, and exact description thereof, which will enable those skilled in the art to make and use the same, reference being had to the accompanying drawings, forming part of this specification.

The object of this invention is to construct a water filter in such a manner that the pressure of the water shall not have a tendency to force the impurities of the water into and through the filtering material, and also to arrange the filter in such a manner that it shall be a water filter and cooler combined. And the invention consists in forming the filter and cooler in such a manner that the weight of the water shall be exerted to force the lower portion upward after it has passed through the filtering material.

The drawing is a vertical section of our combined filter and cooler.

A represents the outside case or box of the filter; B is the space occupied by the water to be filtered; C is the filtering or purifying material, composed of vegetable and animal charcoal, pounded brick, and sand; D is the space for white sand; E is the space for the filtered or pure water, and which forms the cooler; F is the discharge pipe for the pure water; G a pipe for cleansing the filter of sediment and impurities; H is a cylinder placed within the casing A, at such a distance therefrom as to form a water-chamber, as seen at B, and provided with perforations $a$, at its upper end; H' is a smaller cylinder placed concentrically within the cylinder H, and provided near its lower end with perforations, $a'$. The space B and the space occupied by C are annular in shape when the filter is made in a circular form, as represented in the drawing. The filtering material is composed of vegetable and animal charcoal, pounded brick, and sand, or of other similar substances, in such proportions as may be deemed best. The space between the casings H and H' is filled or nearly filled with this material. The space D is filled with sand. All the filtering materials are tightly packed in their respective spaces. The water to be filtered is poured into the space B. The sediment will in a great measure be deposited on the bottom of this space. The upper portion of the body of water will pass into the filtering material through perforations, $a$, in the upper portion of the casing H, which surrounds the filtering material. The water now descends through filtering material till it reaches the perforations $a'$, near the bottom of cylinder H', when it enters the sand in space D, and the weight of the water above now forces it up through the sand and through the perforated top of the space D into the pure-water reservoir or cooler E. The top of the vessel or space D (as well as the sides) is perforated for the admission and discharge of the water. F' is a cover, by removing which ice may be placed in the purified water and kept as long as in the best of the coolers which are made expressly for the purpose. The cover is arranged for the reception of non-conducting material, as seen in the drawing. When necessary the lower portion of the filter, where the sediment and impurities will be deposited, may be cleaned out through the pipe G. Faucets or plugs would of course be attached to the pipes F and G.

Having thus described this invention, what is claimed as new, and desired to be secured by Letters Patent, is—

A water filter and cooler, having the chamber B, the cylinder H, perforated at $a$, filtering material C, cylinder H' perforated at $a'$, chamber D, and clear-water chamber E, all arranged as herein set forth for the purpose specified.

The above specification of the invention of JOHN WATTS, deceased, and myself signed by me this 15th day of November, 1866.

GEO. WAITE,
GEO. WAITE.
Curator of the succession of JOHN WATTS.

Witnesses:
EDWD. BYRNE,
SAML. FLOWER.